(12) United States Patent
Choi et al.

(10) Patent No.: US 12,483,315 B2
(45) Date of Patent: Nov. 25, 2025

(54) BEAM FAILURE RECOVERY METHOD OF BASE STATION IN WIRELESS COMMUNICATION SYSTEM USING RIS, APPARATUS THEREFOR, AND PROGRAM THEREFOR

(71) Applicant: SEOUL NATIONAL UNIVERSITY R&DB FOUNDATION, Seoul (KR)

(72) Inventors: Wan Choi, Seoul (KR); Jin Kyu Lee, Seoul (KR); Kwang Jae Lee, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 18/509,237

(22) Filed: Nov. 14, 2023

(65) Prior Publication Data

US 2024/0162968 A1 May 16, 2024

(30) Foreign Application Priority Data

Nov. 14, 2022 (KR) .................. 10-2022-0151473

(51) Int. Cl.
 *H04B 7/06* (2006.01)
 *H04B 17/318* (2015.01)
(52) U.S. Cl.
 CPC ....... *H04B 7/06964* (2023.05); *H04B 17/328* (2023.05)
(58) Field of Classification Search
 CPC .................. H04B 7/06964; H04B 17/238
 See application file for complete search history.

(56) References Cited

U.S. PATENT DOCUMENTS

| | | | |
|---|---|---|---|
| 11,109,256 B2* | 8/2021 | Zhou | H04W 48/20 |
| 11,239,896 B2* | 2/2022 | Liu | H04W 72/542 |
| 2018/0278467 A1* | 9/2018 | John Wilson | H04W 72/21 |
| 2019/0166645 A1* | 5/2019 | Sadiq | H04B 7/0695 |
| 2019/0306909 A1* | 10/2019 | Zhou | H04W 72/23 |
| 2019/0349960 A1* | 11/2019 | Li | H04L 1/1896 |
| 2019/0364445 A1* | 11/2019 | Kang | H04W 24/04 |
| 2020/0059283 A1* | 2/2020 | Venugopal | H04W 72/046 |
| 2020/0245176 A1* | 7/2020 | Zhou | H04B 7/0408 |

(Continued)

FOREIGN PATENT DOCUMENTS

| | | |
|---|---|---|
| KR | 10-2009-0028953 A | 3/2009 |
| KR | 10-2020-0008666 A | 1/2020 |

(Continued)

*Primary Examiner* — Jaison Joseph
(74) *Attorney, Agent, or Firm* — NSIP Law (57) ABSTRACT

Disclosed is a beam failure recovery method of a base station in a wireless communication system using an RIS. The beam failure recovery method may include configuring a candidate beam set, based on a measured RSRP value in beam sweeping using an antenna, establishing a communication link with a UE through a main beam having the measured RSRP value exceeding a predetermined threshold in the configured candidate beam set, selecting a beam, based on the measured RSRP value, from an SSB to which the main beam belongs and an SSB to which the main beam does not belong when beam failure occurs in the established communication link, and recovering the beam failure with the UE through the selected beam. Accordingly, beam failure recovery may be more effectively performed.

11 Claims, 6 Drawing Sheets

(56) References Cited

U.S. PATENT DOCUMENTS

| | | | | |
|---|---|---|---|---|
| 2021/0058999 | A1* | 2/2021 | Chen | H04W 76/19 |
| 2021/0410221 | A1* | 12/2021 | Zhang | H04L 5/14 |
| 2022/0070843 | A1 | 3/2022 | Levitsky et al. | |
| 2022/0095406 | A1* | 3/2022 | Ahn | H04W 74/006 |
| 2023/0028423 | A1* | 1/2023 | Xu | H04B 7/0639 |
| 2023/0224971 | A1* | 7/2023 | Abedini | H04B 7/0695 |
| | | | | 370/329 |
| 2024/0073938 | A1* | 2/2024 | Goyal | H04B 7/06964 |
| 2024/0146374 | A1* | 5/2024 | Bai | H04W 36/0094 |
| 2024/0162968 | A1* | 5/2024 | Choi | H04B 7/088 |
| 2024/0178959 | A1* | 5/2024 | Xu | H04L 5/0048 |

FOREIGN PATENT DOCUMENTS

| | | |
|---|---|---|
| KR | 10-2022-0067452 A | 5/2022 |
| KR | 10-2022-0116584 A | 8/2022 |
| KR | 10-2022-0137721 A | 10/2022 |

\* cited by examiner

BEAM FAILURE RECOVERY METHOD OF BASE STATION IN WIRELESS COMMUNICATION SYSTEM USING RIS, APPARATUS THEREFOR, AND PROGRAM THEREFOR

CROSS-REFERENCE TO RELATED APPLICATION(S)

This application is based on and claims priority under 35 U.S.C. 119 to Korean Patent Application No. 10-2022-0151473, filed on Nov. 14, 2022, in the Korean Intellectual Property Office, the disclosure of which is herein incorporated by reference in its entirety.

BACKGROUND OF THE INVENTION

1. Field of the Invention

The present disclosure relates to a wireless communication technique and, more particularly, to a beam failure recovery method of a base station in a wireless communication system using a reconfigurable intelligent surface (RIS), an apparatus therefor, and a program therefor.

2. Description of the Prior Art

In 5G NR, multiple-input multiple-output (MIMO)-based beamforming technology is one of key technologies to support various service scenarios, such as enhanced mobile broadband (eMBB), ultra-reliable and low-latency communications (URLLC), and massive machine-type communications (mMTC) defined in 5G NR, and is being used as a solution to overcome path loss and improve a transmission rate in a high-frequency band.

In the 5G NR standard, for successful initial access between a base station (BS) and a user equipment (UE), an optimal beam pair may be formed between the BS and the UE to perform communication. When beam failure (BF) occurs in initial access to the BS, a beam failure recovery (BFR) process is performed to find a new beam pair.

A beam management process of the 5G NR standard starts with beam sweeping that changes a beam to be directed in different directions of a cell so that a wide cell area is covered by using an analog beam with a narrow beam width. The BS selects a beam in beam sweeping, and forms a beam pair with the UE through the selected beam.

In a prior art, when beam failure (BF) occurs due to communication failure, beam failure recovery (BFR) is attempted using a limited number of candidate beams. When beam failure recovery (BFR) is attempted by selecting a beam from among a limited number of candidate beams, unsuccessful beam failure recovery (BFR) is determined as radio link failure, which is a serious problem in 5G NR aimed at low-latency communication.

Accordingly, a method for improving the problem is required.

The above-described information is presented merely as the background information to assist with an understanding of the present disclosure. No determination has been made and no assertion is made as to whether any of the above might be applicable as the prior art with regard to the present disclosure.

Patent Document

KR Patent Publication No. 10-2022-0137721 (published on Oct. 19, 2020)

SUMMARY OF THE INVENTION

An aspect of the present disclosure is to provide a method for effectively performing beam failure recovery (BFR) in a wireless communication system using a reconfigurable intelligent surface (RIS).

The technical subjects pursued in the disclosure may not be limited to the above-mentioned technical subjects, and other technical subjects which are not mentioned may be clearly understood, through the following descriptions, by those skilled in the art to which the disclosure pertains.

To achieve the foregoing technical aspect, a beam failure recovery method of a base station (BS) in a wireless communication system using a reconfigurable intelligent surface (RIS) according to an exemplary embodiment of the present disclosure may include: configuring a candidate beam set, based on a measured reference signal received power (RSRP) value in beam sweeping using an antenna; establishing a communication link with a user equipment (UE) through a main beam having the measured RSRP value exceeding a predetermined threshold in the configured candidate beam set; selecting a beam, based on the measured RSRP value, from a synchronization signal block (SSB) to which the main beam belongs and an SSB to which the main beam does not belong when beam failure occurs in the established communication link; and recovering the beam failure with the UE through the selected beam.

The configuring of the candidate beam set may include including a plurality of beams included in a direct path to the UE and a reflective path through the RIS in the candidate beam set.

The main beam may be included in one of the direct path to the UE and the reflective path through the RIS.

The beam failure recovery method of the base station may further include: obtaining measured values of an angle of arrival (AoA), an angle of departure (AoD), and a time of arrival (ToA) corresponding to each beam of the candidate beam set; and corresponding each beam to the direct path or the reflective path, based on the obtained measured values, before the selecting of the beam.

The corresponding may include corresponding each beam to the direct path or the reflective path, based on the obtained measured values by dividing the beams into two groups, based on K-means clustering.

The selecting of the beam may include selecting a beam having a highest measured RSRP value in the SSB to which the main beam belongs and the SSB to which the main beam does not belong.

The selecting of the beam may include preferentially selecting a beam included in the direct path when a measured RSRP value of the beams included in the direct path and the reflective path exceeds the predetermined threshold.

A base station for performing beam failure recovery in a wireless communication system using an RIS according to an exemplary embodiment of the present disclosure may include: a communication unit including an antenna; and a controller configured to configure a candidate beam set, based on a measured RSRP value in beam sweeping using the antenna, to establish a communication link with a UE through a main beam having the measured RSRP value exceeding a predetermined threshold, and to select a beam, based on the measured RSRP value, from a synchronization signal block (SSB) to which the main beam belongs and an SSB to which the main beam does not belong when beam failure occurs in the established communication link.

The controller may be configured to recover the beam failure with the UE through the selected beam.

The controller may be configured to include a plurality of beams included in a direct path to the UE and a reflective path through the RIS in the candidate beam set.

The main beam may be included in one of the direct path to the UE and the reflective path through the RIS.

The controller may be configured to obtain measured values of an AoA, an AoD, and a ToA corresponding to each beam of the candidate beam set, and to correspond each beam to the direct path or the reflective path, based on the obtained measured values.

The controller may be configured to correspond each beam to the direct path or the reflective path, based on the obtained measured values by dividing the beams into two groups, based on K-means clustering.

The controller may be configured to select a beam having a highest measured RSRP value in the SSB to which the main beam belongs and the SSB to which the main beam does not belong.

The controller may be configured to preferentially select a beam included in the direct path when a measured RSRP value of the beams included in the direct path and the reflective path exceeds the predetermined threshold.

In addition, there may be further provided a computer program stored in a computer-readable recording medium to execute the present disclosure.

In addition, there may be further provided a computer-readable recording medium that records a computer program to execute a method for achieving the present disclosure.

According to various exemplary embodiments of the present disclosure, not only a direct path between a base station and a UE but also a reflective path through an RIS may be used for beam failure recovery, thus more effectively performing beam failure recovery and reducing likelihood of radio link failure.

Advantageous effects of the disclosure may not be limited to the above-mentioned effects, and other effects which are not mentioned may be clearly understood, through the following descriptions, by those skilled in the art.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION OF THE EXEMPLARY EMBODIMENTS

Throughout the specification, the same or like reference signs refer to the same or like elements. As used in the specification, the term "part", "module", or "block" may be implemented by software or hardware, and according to embodiments, a plurality of "parts", "modules", or "blocks" may be implemented as a single element or one "part", "module", or "block" may include a plurality of elements.

Throughout the specification, when an element is referred to as being "connected" to any other element, it may be connected "directly" to the other element, and may also be connected "indirectly" to the other element, and the indirect connection covers a connection via a wireless communication network.

Furthermore, when a part is referred to as "including" an element, it does not exclude the presence of other elements and may further include other elements.

Throughout the specification, when a member is referred to as being "on" any other member, it may be in contact with the other members or other members may also be interposed between the two members.

Such terms as "first" and "second" may be used to distinguish one element from any other element, and the elements are not limited by the terms.

A singular expression is intended to include plural expressions as well, unless the context clearly dictates otherwise.

Identification signs for respective method steps are just used for the sake of descriptive convenience, and do not describe an order of the respective steps. The respective steps may be performed in a different order than the specified order, unless the context clearly dictates otherwise.

Hereinafter, the operation principle and embodiments of the present disclosure will be described with reference to the accompanying drawings.

1. Brief Description of Wireless Communication System

Figure 1:
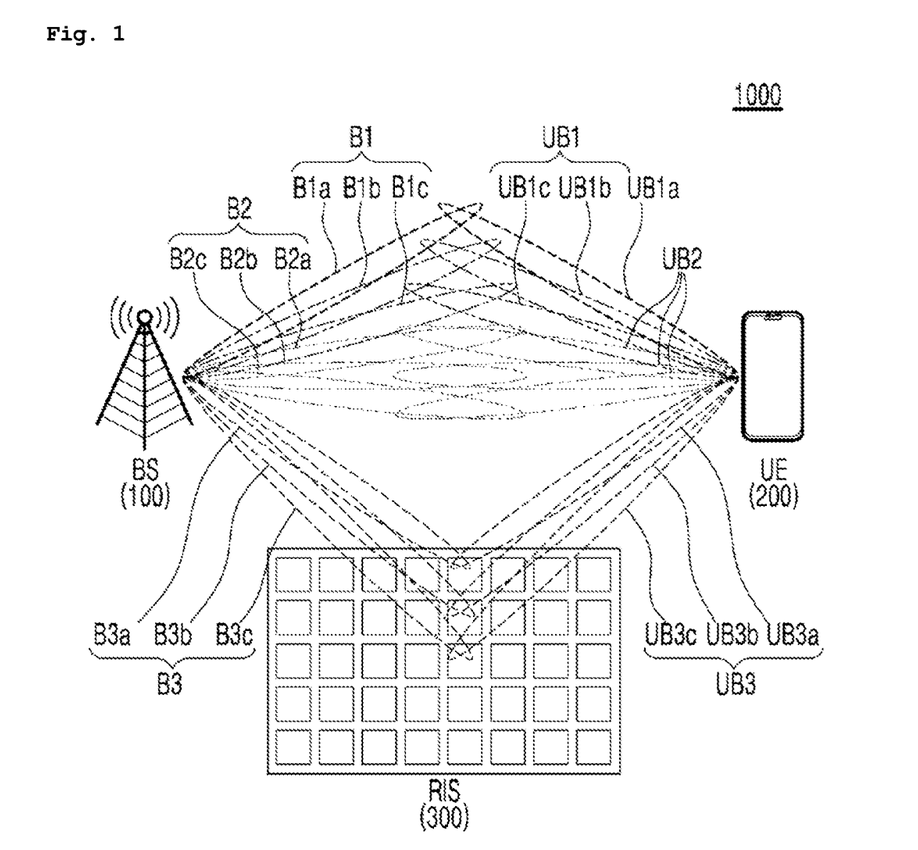
FIG. 1 illustrates a wireless communication system using a reconfigurable intelligent surface (RIS) according to an exemplary embodiment of the present disclosure.

FIG. 1 illustrates a wireless communication system 1000 according to an exemplary embodiment of the present disclosure.

In some examples, the wireless communication system 1000 may be a Long-Team Evolution (LTE) network, an LTE-Advanced (LTE-A) network, an LTE-A Pro network, or a New Radio (NR) network. In some cases, the wireless communication system 1000 may support enhanced broadband communications, ultra-reliable (e.g., mission-critical) communications, low-latency communications, or communications with low-cost and low-complexity devices.

At least one base station (BS) 100 may wirelessly communicate with at least one user equipment (UE) 200 through at least one BS antenna. A BS 100 described herein may be referred to as a base transceiver station, a wireless BS, an access point, a radio transceiver, a NodeB, an eNB (eNodeB), a next-generation NodeB or a giga-NodeB (either of which may be referred to as a gNB), a home NodeB, a home eNodeB, or other suitable teams by those skilled in the art, or may include the same.

The wireless communication system 1000 may include different types of BSs 100 (e.g., macro or small-cell BSs). A UE 200 described herein may communicate with various types of BSs and network equipment including macro eNBs, small-cell eNBs, gNBs, and relay BSs.

The BS 100 may be associated with a particular geographic coverage area in which communications with UE 200 are supported. Each BS 100 may provide communication coverage for each geographic coverage area via communication links, and communication links between the BS 100 and the UE 200 may utilize at least one carrier. Communication links of the wireless communication system 1000 may include uplink transmissions from the UE 200 to the BS 100 or downlink transmissions from the BS 100 to the UE 200. The downlink transmissions may also be referred to as forward link transmissions, while uplink transmissions may also be referred to as backward link transmissions.

The geographic coverage area for the BS 100 may be divided into sectors forming a portion of the geographic coverage area, and each sector may be associated with a cell. For example, each BS 100 may provide communication coverage for a macro cell, a small cell, a hotspot, other types of cells, or various combinations thereof. In some examples, the BS 100 may be mobile, thus providing communication coverage for a moving geographic coverage area. In some examples, different geographic coverage areas associated with different technologies may overlap, and the overlapping geographic coverage areas associated with the different technologies may be supported by the same BS or by different BSs. The wireless communication system 1000 may include, for example, a heterogeneous LTE/LTE-A/LTE-A Pro or NR network in which different types of BSs provide coverage for various geographic coverage areas.

The term "cell" may refer to a logical communication entity used to communicate with the BS 100 (e.g., through a carrier), and may be associated with an identifier for distinguishing neighboring cells (e.g., a physical cell identifier (PCID) or a virtual cell identifier (VCID)) operating through the same carrier or different carriers. In some examples, a carrier may support a plurality of cells, and different cells may be configured according to different protocol types (e.g., machine-type communication (MTC), narrowband Internet-of-things (NB-IoT), enhanced mobile broadband (eMBB), or the like) capable of providing access for different types of devices. In some cases, the team "cell" may refer to a portion of a geographic coverage area (e.g., a sector) in which a logical entity operates.

The term "carrier" may refer to a set of radio-frequency spectrum resources having a defined physical layer structure for supporting communications through a communication link. For example, a carrier of a communication link may include a portion of a radio-frequency spectrum band operating according to physical-layer channels for a given radio access technology. Each physical-layer channel may carry user data, control information, or other signaling. A carrier may be associated with a predefined frequency channel (e.g., an evolved universal mobile telecommunication system terrestrial radio access (E-UTRA) absolute radio frequency channel number (EARFCN)), and may be positioned according to a channel raster for discovery by the UE 200. Carriers may be downlink or uplink (e.g., in a frequency-division duplexing (FDD) mode), or may be configured to carry downlink and uplink communications (e.g., in a time-division duplexing (TDD) mode). In some examples, signal waveforms transmitted through a carrier (e.g., by using multi-carrier modulation (MCM) techniques, such as orthogonal frequency-division multiplexing (OFDM) or discrete Fourier transform spread-OFDM (DFT-S-OFDM)) may include a plurality of subcarriers.

In some examples, the BS 100 or the UE 200 may include a plurality of antennas, which may be employed to use techniques, such as transmit diversity, receive diversity, multiple-input multiple-output (MIMO) communications, or beamforming. For example, the wireless communication system 1000 may use a transmission scheme between a transmitting device (e.g., the BS 100) and a receiving device (e.g., the UE 200), where the transmitting device may include a plurality of antennas and the receiving device may include one or more antennas. MIMO communications may use multipath signal propagation to increase spectral efficiency by transmitting or receiving a plurality of signals through different spatial layers, which may be referred to as spatial multiplexing.

The plurality of signals may be transmitted by the transmitting device, for example, via different antennas or different combinations of antennas. Similarly, the plurality of signals may be received by the receiving device via different antennas or different combinations of antennas. Each of the plurality of signals may be referred to as a separate spatial stream, and may carry bits associated with the same data stream (e.g., the same codeword) or different data streams. The different spatial layers may be associated with different antenna ports used for channel measurement and reporting. MIMO techniques include single-user MIMO (SU-MIMO), in which a plurality of spatial layers is transmitted to the same receiving device, and multiple-user MIMO (MU-MIMO), in which a plurality of spatial layers is transmitted to a plurality of devices.

Beamforming, which may also be referred to as spatial filtering, directional transmission, or directional reception, is a signal processing technique to be used for a transmitting device or a receiving device (e.g., the BS 100 or the UE 200) to form or steer an antenna beam (e.g., a transmission beam or a reception beam) along a spatial path between the transmitting device and the receiving device. Beamforming may be achieved by combining signals communicated through antenna elements of an antenna array such that signals transmitted in specific orientations with respect to the antenna array experience constructive interference while others experience destructive interference. Adjusting the signals communicated through the antenna elements may include the transmitting device or the receiving device applying specific amplitude and phase offsets to signals carried through respective antenna elements associated with the device. Adjustments associated with the respective antenna elements may be defined by a beamforming weight set associated with a specific orientation (e.g., with respect to an antenna array of the transmitting device or the receiving device or to some other orientations).

In an example, the BS 100 may use a plurality of antennas or antenna arrays to perform beamforming operations for directional communications with the UE 200. For example, some signals (e.g., synchronization signals, reference signals, beam selection signals, or other control signals) may be transmitted a plurality times by the BS 100 in different directions, which may include a signal transmitted according to different beamforming weight sets associated with the different transmission directions. Transmissions in the different beam directions may be used to identify a beam direction in subsequent transmission and/or reception by the BS 100 (e.g., by the BS 100 or the receiving device, for example, the UE 200).

Some signals, for example, data signals associated with a particular receiving device, may be transmitted by the BS 100 in a single beam direction (e.g., a direction associated with the receiving device such as the UE 200). In some examples, a beam direction associated with transmissions according to the single beam direction may be determined based at least partly on signals transmitted in different beam directions. For example, the UE 200 may receive at least one of signals transmitted by the BS 100 in different directions, and may report an indication of the signal received by the UE 200 to the BS 100 with the highest signal quality or a signal quality acceptable otherwise. While these techniques are described with reference to signals transmitted by the BS 100 in one or more directions, the UE 200 may use similar techniques to transmit signals a plurality of times in different directions (e.g., to identify a beam direction in subsequent transmission or reception by the UE 200) or to transmit a signal in a single direction (e.g., to transmit data to the receiving device).

When receiving various signals, such as synchronization signals, reference signals, beam selection signals, or other control signals, from the BS 100, the receiving device (e.g., the UE 200, which may be an example of a mmW receiving device) may attempt a plurality of reception beams. For example, the receiving device may attempt a plurality of reception directions by receiving the signals through different antenna subarrays, by processing the received signals according to different antenna subarrays, by receiving the signals according to different reception beamforming weight sets applied to the signals received via one set of antenna elements of an antenna array, or by processing the received signals according to different reception beamforming weight sets applied to the signals received via one set of antenna elements of an antenna array, any of which may be referred to as "listening" according to different reception beams or reception directions. In some examples, the receiving device may use a single reception beam to receive a signal along a single beam direction (e.g., when receiving a data signal). The single reception beam may be aligned in a beam direction determined based on listening according to different reception beam directions (e.g., a beam direction determined to have the highest signal strength or the largest signal-to-noise ratio, or otherwise a signal quality allowable based on listening according to a plurality of beam directions).

In some cases, the antennas of the BS 100 or the UE 200 may be located within one or more antenna arrays, and may support MIMO operations or transmission or reception beamforming. For example, one or more BS antennas or antenna arrays may be colocated in an antenna assembly, such as an antenna tower. In some cases, antennas or antenna arrays associated with the BS 100 may be located in various geographic locations. The BS 100 may have an antenna array having a plurality of rows and columns of antenna ports to be used by the BS 100 to support beamforming for communications with the UE 200. Similarly, the UE 200 may have one or more antenna arrays capable of supporting various MIMO or beamforming operations.

2. Detailed Description of Wireless Communication System Using RIS

Figure 2:
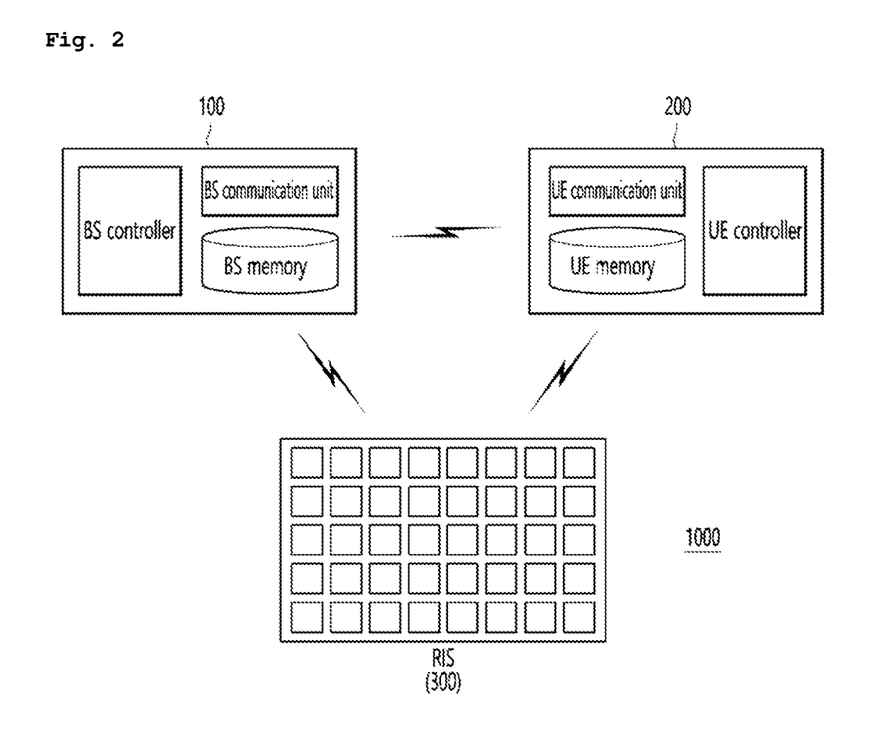
FIG. 2 is a relative block diagram illustrating a configuration of a wireless communication system using an RIS according to the present disclosure.

A wireless communication system 1000 according to an exemplary embodiment of the present disclosure will be described in detail with reference to FIG. 1 and FIG. 2. FIG. 1 illustrates the wireless communication system 1000 according to an exemplary embodiment of the present disclosure, and FIG. 2 is a relative block diagram illustrating the configuration of the wireless communication system 1000 according to the present disclosure.

The wireless communication system 1000 may include at least one BS 100, at least one UE 200, and a reconfigurable intelligent surface (RIS) 300.

The RIS 300 is a reconfigurable intelligent surface, may be configured as a device with, may be disposed between the BS 100 and the UE 200, and may reflect radio waves, thereby supporting communication between the BS 100 and the UE 200. Thus, even though an obstacle exists between the BS 100 and the UE 200 in a wireless environment, the RIS 300 may enable communication between the BS 100 and the UE 200.

The RIS 300 may increase a transmission rate by utilizing a reflective path by the RIS 300 in an area where there is no visible path by using electromagnetic characteristics of the surface of an antenna including a plurality of passive elements capable of adjusting an amplitude and a phase, and may be configured as a thin metasurface.

The passive elements may not have a computational capability, such as channel estimation. The RIS 300 may form a beam of a desired shape by adjusting the phase of reflected radio waves, that is, reflected waves. That is, in a downlink (DL) in which the BS 100 and the UE 200 communicate by using the RIS 300, the RIS 300 may foam a beam of a desired shape for the UE 200. In addition, each of the passive elements may be configured as a super-cell, and may include at least one unit cell, at least one tunable element, and at least one sensing element (sensing element), but the exemplary embodiment is not limited thereto.

The BS 100 may include a BS communication unit including an antenna, a BS memory, and a BS controller. The UE 200 may include a UE communication unit, a UE memory, and a UE controller. However, the BS 100 and the UE 200 may include more or fewer components than the foregoing components according to an embodiment.

The BS communication unit may include the antenna (e.g., a MIMO supporting antenna). The BS communication unit may transmit radio waves to the UE communication unit through a direct path, and may transmit radio waves through a reflective path using the RIS 300.

The BS memory (or UE memory) may store data for supporting various functions and a program for an operation of the BS controller, may store input/output data, and may store a plurality of application programs (or applications), pieces of data for a specific process of the BS 100, and instructions. At least some of these application programs may be downloaded from an external server through wireless communication, and an over-the-air (OTA) function may be installed to this end.

The BS memory (or UE memory) may include at least one type of storage medium among a flash memory type, a hard disk type, a solid state disk (SSD) type, a silicon disk drive (SDD) type, a multimedia card micro type, a card-type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The BS controller may control the components of the BS 100, may include one or more processors, and may perform beamforming through the BS communication unit.

The BS 100 may attempt beam pairing with the UE through a plurality of beams. For example, the BS 100 may beam pairing through a first beam set B1 (B1a to B1c), a second beam set B2 (B2a to B2c), and a third beam set B3 (B3a to B3c). Similarly, the UE 200 may attempt beam pairing through a first beam set UB1 (UB1a to UB1c), a second beam set UB2 (UB2a to UB2c), and a third beam set UB3 (UB3a to UB3c). The number of beams is not limited to an illustrated number, and more beams or fewer beams may be applied.

Beams included in the same beam set (e.g., B1a to B1c included in B1) may be beams having a high spatial correlation in the same synchronization signal block (SSB), and may include beams included in the SSB or a channel state information-reference signal (CSI-RS) within a band of the SSB.

The BS controller may configure a candidate beam set, based on a measured reference signal received power (RSRP) value in beam sweeping using the BS antenna. The BS controller may establish a communication link with the UE through a main beam having a measured RSRP value exceeding a predetermined threshold (e.g., a beam having the highest measured RSRP value) in the configured candidate beam set.

In an optional exemplary embodiment, the BS controller may select a beam (e.g., a main beam), based on a measured RSRP value in beam sweeping using the BS antenna, and may include beams other than the selected beam in a candidate beam set.

Beam sweeping may be a process for establishing a communication link through beamforming when a communication link between the BS 100 and the UE 200 is not established.

When beam failure occurs in the established communication link, the BS controller may select a beam from an SSB to which the main beam belongs and an SSB to which the main beam does not belong, based on the measured RSRP value.

That is, in a state in which the communication link is established (a state other than radio link failure), the BS controller may select a beam from the SSB to which the main beam belongs and the SSB to which the main beam does not belong (including a CSI-RS within a band of the SSB), instead of selecting only a beam that is included in the SSB to which the main beam belongs and has a high spatial correlation. For example, the BS controller may also select beams B3a to B3c included in the third beam set B3 included in the reflective path by the RIS 300 according to the measured RSRP value.

Even though beam failure of the main beam occurs, the BS controller may recover the beam failure with the UE through the beam selected from the candidate beam set, thus preventing radio link failure.

The BS controller may include a plurality of beams included in direct paths B1 to UB1 and B2 to UB2 with the UE 200 and the reflective path B3 to UB3 through the RIS 300 in the candidate beam set. Here, the BS controller may include the beam selected as the main beam in the candidate beam set, or may exclude the beam selected as the main beam according to an embodiment.

In an optional or additional exemplary embodiment, the BS controller may select a main beam from one of the direct paths to the UE and the reflective path through the RIS.

Figure 3:
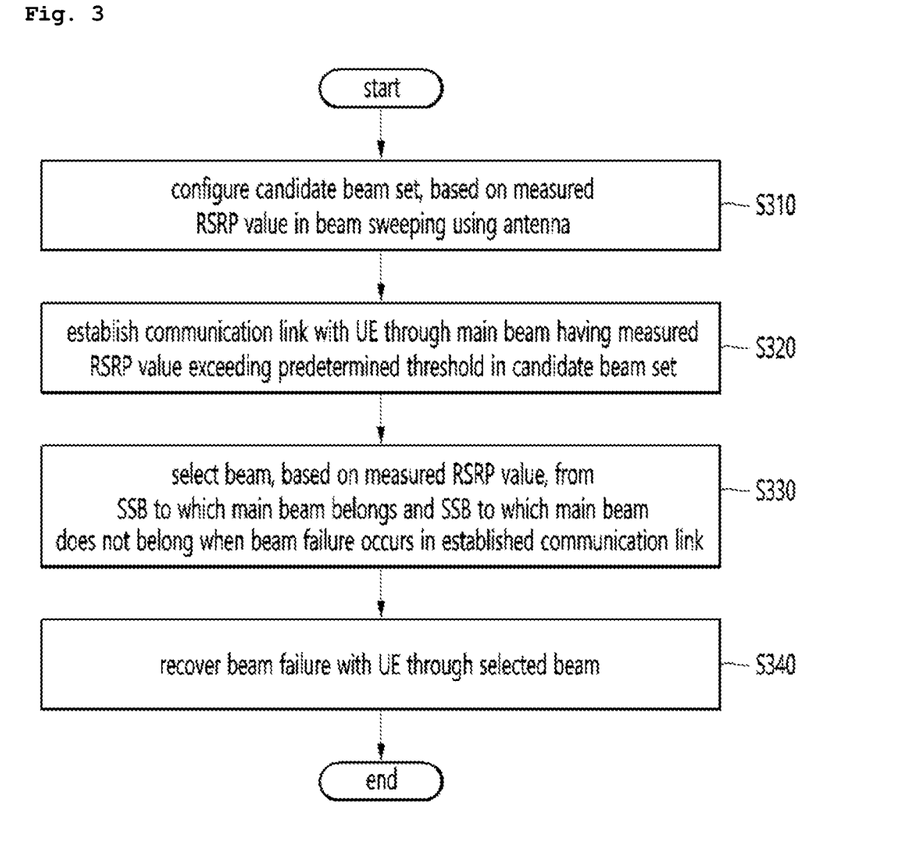
FIG. 3 is a sequence diagram illustrating a beam failure recovery (BFR) method of a base station in a wireless communication system using an RIS according to an exemplary embodiment of the present disclosure.
Figure 4:
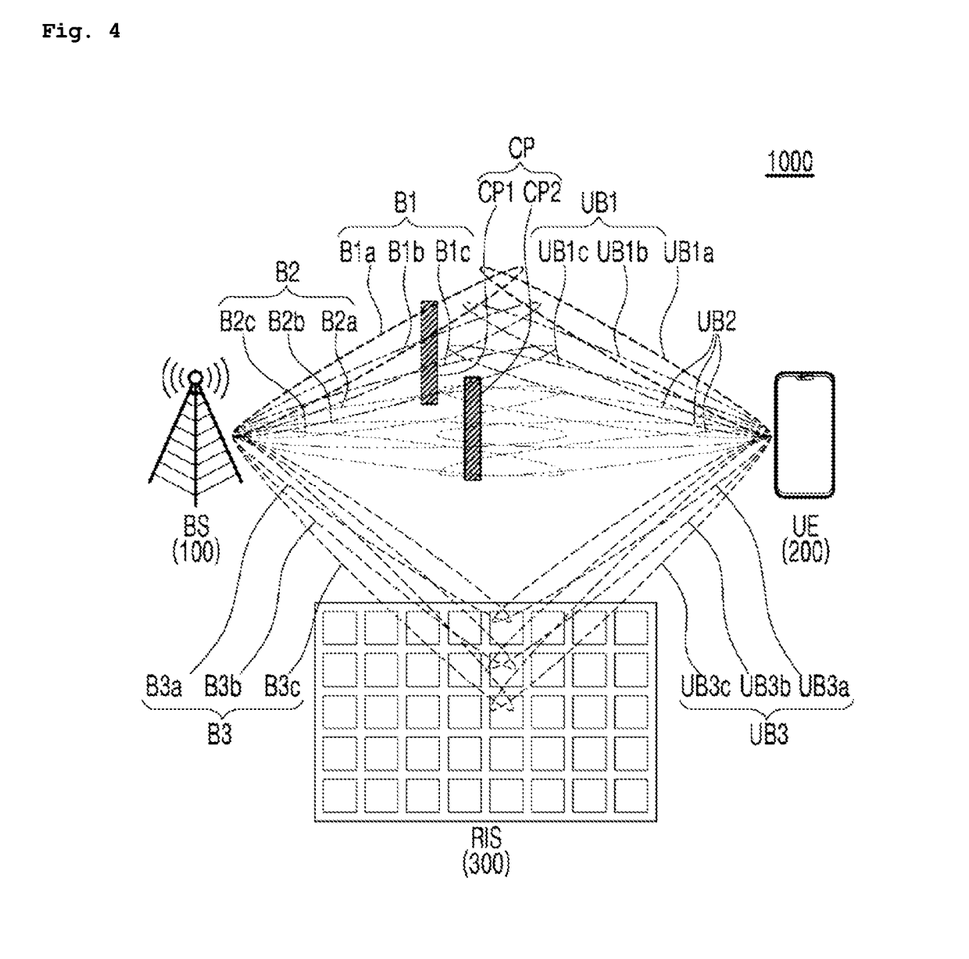
FIG. 4 illustrates a method of performing beam failure recovery (BFR) when beam failure (BF) occurs in a wireless communication system using an RIS according to an exemplary embodiment of the present disclosure.
Figure 5:
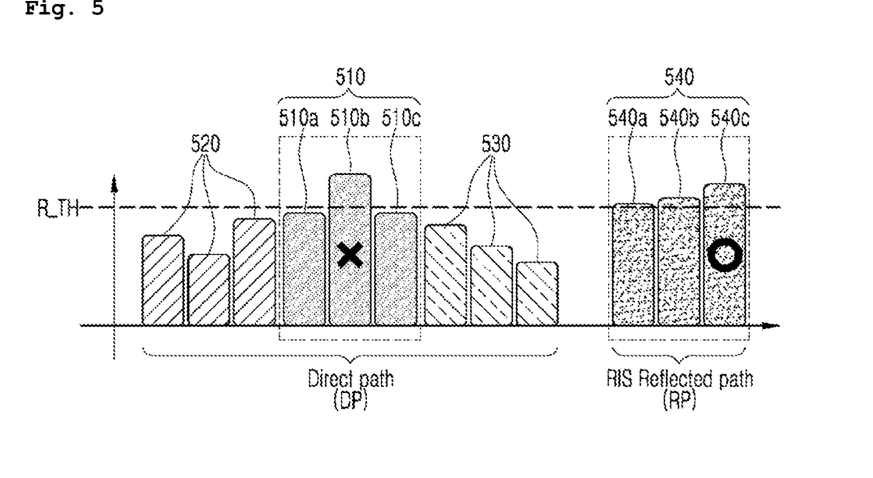
FIG. 5 and FIG. 6 illustrate a method of performing beam failure recovery, based on a measured RSRP value when beam failure occurs according to various exemplary embodiments of the present disclosure.
Figure 6:
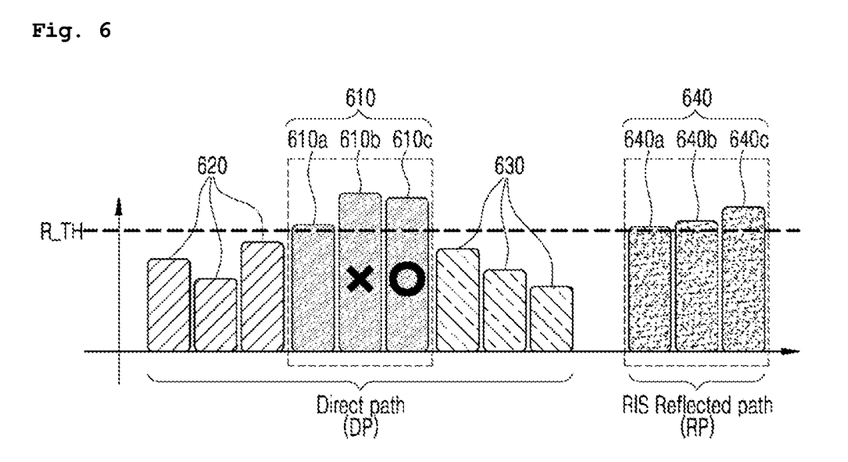

FIG. 3 is a sequence diagram illustrating a beam failure recovery (BFR) method of a BS 100 in a wireless communication system 1000 using an RIS 300 according to an exemplary embodiment of the present disclosure, FIG. 4 illustrates a method of performing beam failure recovery when beam failure occurs in a wireless communication system using an RIS according to an exemplary embodiment of the present disclosure, and FIG. 5 and FIG. 6 illustrate a method of performing beam failure recovery, based on a measured RSRP value when beam failure occurs according to various exemplary embodiments of the present disclosure.

First, a BS controller of the BS 100 may configure a candidate beam set, based on a measured reference signal received power (RSRP) value in beam sweeping using an antenna (S310).

The BS controller may include all beams for beam sweeping in the candidate beam set, and may select a main beam and include beams excluding the main beam in the candidate beam set according to an embodiment.

The BS controller may establish a communication link with a UE 200 through the main beam having a measured RSRP value exceeding a predetermined threshold (in the configured candidate beam set) (S320).

When beam failure (BF) occurs in the established communication link, the BS controller may select a beam, based on a measured RSRP values from a synchronization signal block (SSB) to which the main beam belongs and an SSB to which the main beam does not belong (S330).

Referring to FIG. 4, the BS controller of the BS 100 may include each beam B1a, B1b-B2a-B3b, B3c, and the like in the candidate beam set, and when a communication problem (CP) CP1 and CP2 occurs (when a beam has a low measured RSRP value) in a specific beam pair B1a-B1c and B2a-B2c, the BS controller may measure the RSRP of a beam B1b and B1c included in the SSB to which the main beam B1a belongs and a beam B2a, B2b, B2c, B3a, B3b, B3c, and the like not included in the SSB to which the main beam B1a does not belong, and may select a beam to replace the main beam B1a according to a measured RSRP value.

Here, the BS controller may select a beam having a high RSRP and no occurrence of beam failure, and may select a beam with the highest measured RSRP value as an alternative beam among beams (B3a to B3c) disposed on a reflective path through the RIS 300.

The BS controller may recover the beam failure with the UE 200 through the selected beam (S340).

When configuring the candidate beam set, the BS controller may include a plurality of beams included in a direct path to the UE 200 and the reflective path through the RIS in the candidate beam set. The main beam may be included in one of the direct path to the UE and the reflective path through the RIS.

In an optional exemplary embodiment, the BS controller may determine whether each beam corresponds to the direct path or an indirect path. Specifically, the BS controller may obtain measured values of an angle of arrival (AoA), an angle of departure (AoD), and a time of arrival (ToA) corresponding to each beam in the candidate beam set in advance (e.g., when selecting the alterative beam after the beam failure of the main beam), thereby determining whether each beam is included in the direct path or the indirect path.

The AoA is an arrival angle, the AoD is a departure angle, and the ToA is elapsed time. All of the AoA, the AoD, and the ToA may be measured. The BS 100 or the UE 200 may measure the AoA, the AoD, and the ToA, and may collect the measured values through communication.

The BS controller may correspond each beam to the direct path or the reflective path, based on the obtained measured values. Here, the BS controller may divide the beams into two groups, based on K-means clustering, and may divide the beams into two groups by setting K to 2. The BS controller may correspond each beam to the direct path or the reflective path.

Referring to FIG. 5, the BS controller may configure three candidate beam sets 510, 520, and 530 included in the direct path DP and one candidate beam set 540 included in the reflective path RP. When beam failure of the main beam 510b occurs and the measured RSRP value of each beam included in the direct path and the reflective path for beam failure recovery exceeds a predetermined threshold R_TH, the controller may select a beam 540c even through the beam 540c is included in the reflective path. That is, the BS controller may select a beam having the highest measured RSRP value from the SSB to which the main beam 510b belongs and the SSB to which the main beam does not belong regardless of a path (direct or reflective).

As described above, when beam failure recovery is performed using the reflective path through the RIS 300, radio link failure may be prevented, thus omitting a procedure of performing beam sweep again, and the reflective path through the RIS 300 may be formed due to properties of radio waves exhibiting 5G straightness, thus more effectively preparing for communication failure (beam failure).

Referring to FIG. 6, when beam failure occurs and beam failure recovery (BFR) is performed, the BS controller may measure the RSRP of each beam, and may preferentially select a beam included in the direct path when some of measured RSRP values exceed a predetermined threshold R_TH. In particular, the BS controller may select a beam 610c having the highest measured RSRP value among beams on the direct path. Here, the BS controller may select the beam on the direct path even though a beam having a higher measured RSRP value than that on the direct path exists on the reflective path.

The disclosed embodiments may be implemented in the form of a recording medium in which computer-executable instructions are stored. The instructions may be stored in the form of program codes, and when executed by a processor, may generate a program module to execute the operations of the disclosed embodiments. The recording medium may be implemented as a computer-readable recording medium.

The computer-readable recording medium includes all types of recording mediums in which instructions interpretable by a computer are stored. Examples of the computer-readable medium may include a ROM (Read Only Memory), a RAM (Random Access Memory), a magnetic tape, a magnetic disk, a flash memory, an optical data storage device, and the like.

The disclosed embodiments have been described above with reference to the accompanying drawings. Those skilled in the art will appreciate that the present disclosure may be implemented in different forms from the disclosed embodiments without making changes to the technical idea or the essential features of the present disclosure. Therefore, the disclosed embodiments should be construed not from limitative viewpoints but from illustrative viewpoints in all aspects.

What is claimed is:

1. A beam failure recovery method of a base station (BS) in a wireless communication system using a reconfigurable intelligent surface (RIS), the beam failure recovery method comprising:
    configuring a candidate beam set, based on a measured reference signal received power (RSRP) value in beam sweeping using an antenna;
    establishing a communication link with a user equipment (UE) through a main beam having the measured RSRP value exceeding a predetermined threshold in the configured candidate beam set;
    selecting a beam, based on the measured RSRP value, from a synchronization signal block (SSB) to which the main beam belongs and an SSB to which the main beam does not belong when beam failure occurs in the established communication link; and
    recovering the beam failure with the UE through the selected beam,
    wherein the configuring of the candidate beam set comprises comprising a plurality of beams included in a direct path to the UE and a reflective path through the RIS in the candidate beam set, and
    wherein the beam failure recovery method further comprises, before the selecting of the beam,
        obtaining measured values of an angle of arrival (AoA), an angle of departure (AoD), and a time of arrival (ToA) corresponding to each beam of the candidate beam set; and
        corresponding each beam to the direct path or the reflective path, based on the obtained measured values.

2. The beam failure recovery method of claim 1, wherein the main beam is included in one of the direct path to the UE and the reflective path through the RIS.

3. The beam failure recovery method of claim 1, wherein the corresponding comprises corresponding each beam to the direct path or the reflective path, based on the obtained measured values by dividing the beams into two groups, based on K-means clustering.

4. The beam failure recovery method of claim 3, wherein the selecting of the beam comprises selecting a beam having a highest measured RSRP value in the SSB to which the main beam belongs and the SSB to which the main beam does not belong.

5. The beam failure recovery method of claim 3, wherein the selecting of the beam comprises preferentially selecting a beam included in the direct path when a measured RSRP value of the beams included in the direct path and the reflective path exceeds the predetermined threshold.

6. A program stored in a non-transitory computer-readable recording medium to execute the beam failure recovery method of claim 1 in combination with a computer.

7. A base station for performing beam failure recovery in a wireless communication system using a reconfigurable intelligent surface (RIS), the base station comprising:
    a communication unit comprising an antenna; and
    a controller configured to configure a candidate beam set, based on a measured reference signal received power (RSRP) value in beam sweeping using the antenna, to establish a communication link with a user equipment (UE) through a main beam having the measured RSRP value exceeding a predetermined threshold, and to select a beam, based on the measured RSRP value, from a synchronization signal block (SSB) to which the main beam belongs and an SSB to which the main beam does not belong when beam failure occurs in the established communication link,
    wherein the controller is configured to recover the beam failure with the UE through the selected beam,
    wherein the controller is configured to comprise a plurality of beams included in a direct path to the UE and a reflective path through the RIS in the candidate beam set, and
    wherein the controller is configured to obtain measured values of an angle of arrival (AoA), an angle of departure (AoD), and a time of arrival (ToA) corresponding to each beam of the candidate beam set, and to correspond each beam to the direct path or the reflective path, based on the obtained measured values.

8. The base station of claim 7, wherein the main beam is included in one of the direct path to the UE and the reflective path through the RIS.

9. The base station of claim 7, wherein the controller is configured to correspond each beam to the direct path or the reflective path, based on the obtained measured values by dividing the beams into two groups, based on K-means clustering.

10. The base station of claim 9, wherein the controller is configured to select a beam having a highest measured RSRP value in the SSB to which the main beam belongs and the SSB to which the main beam does not belong.

11. The base station of claim 9, wherein the controller is configured to preferentially select a beam included in the direct path when a measured RSRP value of the beams included in the direct path and the reflective path exceeds the predetermined threshold.

* * * * *